Oct. 28, 1924.  
A. L. MORON  
MILK DISPENSER  
Filed July 12, 1923  
1,513,413  
2 Sheets-Sheet 2
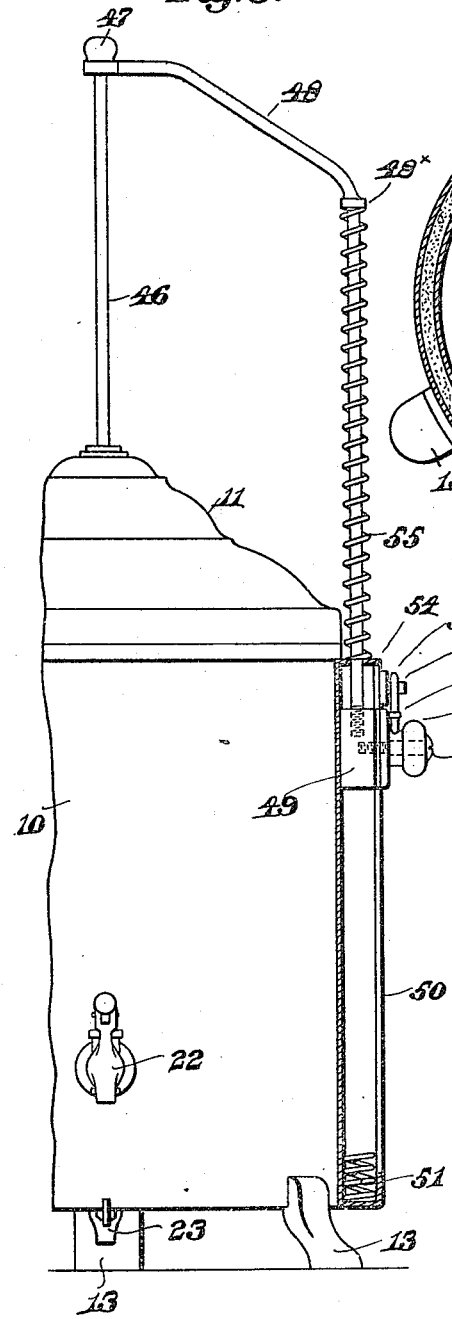
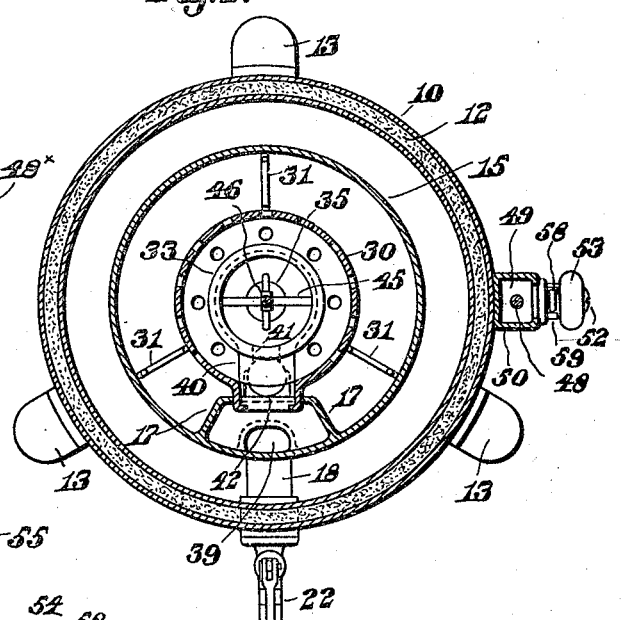
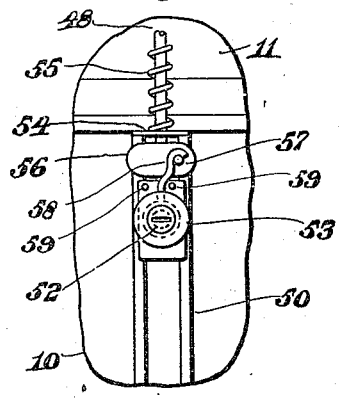
Inventor:
Alfred L. Moron,
by Walter E. Lombard,
Atty.

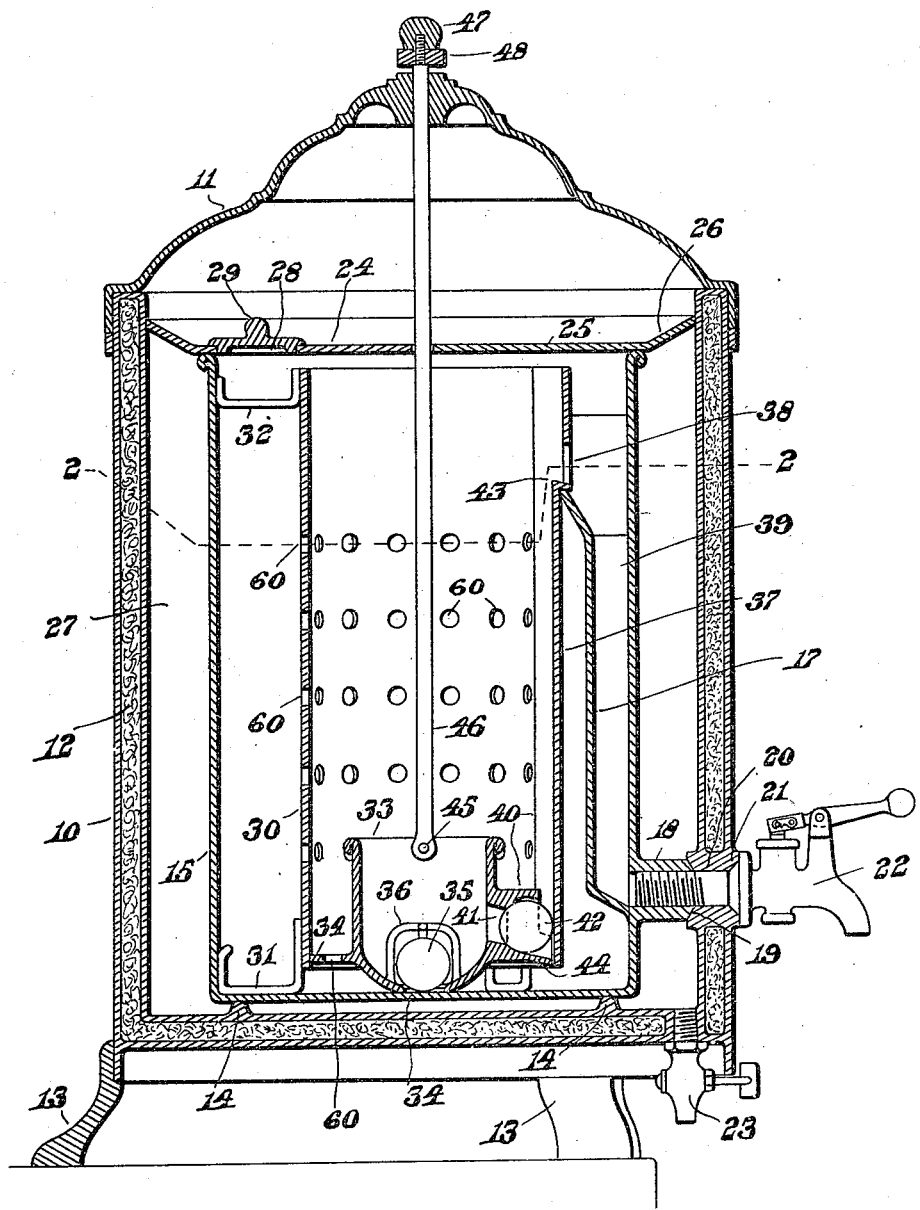

Patented Oct. 28, 1924.

1,513,413

UNITED STATES PATENT OFFICE.

ALFRED L. MORON, OF EAST BOSTON, MASSACHUSETTS.

MILK DISPENSER.

Application filed July 12, 1923. Serial No. 651,002.

*To all whom it may concern:*

Be it known that I, ALFRED L. MORON, a citizen of the United States of America, and a resident of East Boston, in the county of Suffolk and State of Massachusetts, have invented certain new and useful Improvements in Milk Dispensers, of which the following is a specification.

This invention relates to devices for dispensing liquids in restaurants, lunch rooms, and like places, the principal object of the invention being to provide a device of this character in which a thorough mixture of the liquid is assured each time a portion of the liquid is removed from the container, thereby insuring that all customers will be treated alike.

The invention is primarily adapted for dispensing milk and consists of a container provided with a cooling compartment enclosing the milk tank, in which is disposed a perforated receptacle containing a cup-shaped milk lifter.

The invention further consists in providing the cup-shaped milk lifter with a valve in the bottom thereof which will open during the lowering of the lifter and which will close during its upward movement.

The invention further consists in providing the lifter with a valve in its vertical wall which is designed to be closed during the lowering of said lifter and during the raising of said lifter until it reaches its highest position, at which point this side valve will open and permit the contents of the lifter to flow therefrom into a downward passage, at the bottom of which is the delivery faucet.

The invention further consists in means on the outside of the tank for raising and lowering the cup-shaped milk lifter.

The invention further consists in certain novel features of construction and arrangement of parts which will be understood readily by reference to the description of the drawings and to the claims to be hereinafter given.

For the purpose of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization as herein shown and described, except as required by the scope of the appended claims.

Of the drawings:

Figure 1 represents a vertical section of a device embodying the principles of the present invention.

Figure 2 represents a horizontal section of same on line 2, 2 on Fig. 1.

Figure 3 represents a partial side elevation of same, a portion thereof being in section, and Figure 4 represents an elevation of the locking device.

Similar characters indicate like parts throughout the several figures of the drawings.

In the drawings, 10 is a liquid container provided with a cover 11.

The walls of the container are provided with chambers 12 filled with ground cork or some similar material.

The container rests upon legs 13, 13 and the inner face of its bottom has upwardly extending lugs 14 upon which is positioned a tank 15.

The tank 15 is provided with a passage 16 open at the top and closed at the bottom, said passage 16 being formed by a U-shaped plate 17 soldered or otherwise secured to the inner face of the wall of said tank.

The tank 15 has a tubular hub 18 extending outwardly therefrom, the bore of which communicates with the lower end of said passage 16.

The outer end of said hub 18 is cone-shaped and fits a conical depression 19 in the inner face of the wall of said container, said depression surrounding an opening 20 through said wall.

At the outer end of said opening is another conical depression 21, to which is fitted a cone-shaped portion of the faucet 22.

The faucet is provided with a tubular shank which extends through the opening 20 and has its inner end threaded to the core of the hub 18.

When the faucet 22 has been properly positioned, the end of the hub 18 and the cone-shaped portion of the faucet 22 will be drawn tightly into the depressions 19 and 21 and make a perfectly tight joint from which can leak none of the iced water placed in the container 10 around the tank 15.

A pet cock 23 is provided by which water may be drawn from the container 10 when desired.

This pet cock may be of any well known construction.

The wall of the container 10 extends above the wall of the tank 18, and resting upon the latter wall is a two-part cover 24, 25, having an annular inclined portion 26 extending downwardly from the wall of the container.

This two-part cover 24, 25 closes the upper end of the ice chamber 27.

One part 24 of the cover has an opening 28 therethrough provided with a closure 29 which may be removed when it is desired to pour a fresh supply of milk or other liquid into the tank 15.

Positioned in the tank 15 is a perforated cylinder 30 provided at the bottom with positioning legs 31 to retain said cylinder 30 centrally disposed within the tank 15.

At the top of the cylinder is a lateral arm 32, the outer end of which bears against the wall of the tank 15.

Within the cylinder 30 is disposed the lifter 33, which is cup-shaped as shown in Fig. 1, and provided with a peripheral perforated flange 34 extending to the wall of said cylinder 30.

The bottom of the lifter 33 has an opening 34 therein, adapted to be closed by the ball 35 when the lifter is raised in the cylinder 30.

A cage 36 extends over the ball 35 and limits its movement and prevents the displacement thereof, when the lifter 33 is being moved downwardly within the cylinder 30.

At one side of the cylinder 30, the wall thereof projects outwardly beyond the periphery of said cylinder as at 37, this projection extending from the bottom of the cylinder to the top thereof, and near the top it is provided with an outlet opening 38 into the upper end of the passage 39, the lower end of which has an outlet through the faucet 22.

The cup-shaped lifter 33 has a hub 40 extending laterally therefrom, with an opening 41 therethrough, the outer end of the opening having a seat for a ball 42 a portion of which bears against the wall of the projecting portion 37.

As the lifter is raised, the ball 42 will be retained against its seat by said wall and will close the opening 41.

When the ball 42 reaches the point 43 it will move down the inclined surface 44 and permit the liquid in said lifter to flow therefrom through the opening 41 into the passage 39 from which it may be drawn off through the faucet 22.

The opening 34 is of such size as to permit the ball 35 to extend partially through the same so that when the lifter 33 is in its lowest position, as indicated in Fig. 1, the ball will be raised slightly to permit liquid to flow through said opening.

As soon as the lifter is raised, however, the ball 35 will be forced to its seat and close the opening so that no liquid can pass therethrough.

The lifter can be made of such size as to measure off a full glass of milk or other liquid each time it is raised in the cylinder 36.

The cup-shaped member 33 has secured thereto a diametrically disposed rod 45 to which the lower end of the lifting rod 46 is connected.

The upper end of the rod 46 extends through the cover 11 and has a head 47 threaded thereto, against the under face of which bears the upper end of a rod 48, the lower end of which is mounted in a block 49 slidably positioned in the vertical guide-way 50 on the outer face of the wall of the container 10.

In the lower end of the guide-way 50 is a spring 51, against which the block 49 comes into contact when said block reaches its lowest position, thereby obviating any shock.

The block 49 has a headed stud 52 projecting therefrom on which is revolubly mounted the knob 53 by which the block 49 may be lowered when it is desired to dispense the liquid within the tank 15.

The rod 48 has a shouldered projection 48ˣ between which and the top plate 54 of the guide-way 50 is a helical spring 55 which normally retains the block 49 in its highest position with the lifter 33 at the top of the perforated cylinder 30.

Secured to the upper end of the guide-way 50 is a plate 56 having a pin 57 extending therefrom and with which the hook 58 is adapted to engage to retain the lifter 33 in its highest position.

The hook 58 is adapted to move about the axis of the pin 51 between the pins 59 which limit the movement of said hook in either direction.

The cylinder 30 is provided with a plurality of perforations 60 in the side and bottom thereof, through which the liquid in the tank 15 is adapted to freely flow.

When it is desired to dispense liquid from the tank 15 the operator releases the hook 58 from the pin 57 by turning the knob contraclockwise, and he then, still grasping said knob, forces the block 49 downwardly to the bottom of the guide-way 50.

This downward movement of the block 49 and rod 48 connected thereto will impart a downward movement to the rod 46 and the liquid lifter 33 secured to the lower end thereof.

As the lifter 33 moves downwardly, the ball 42 will be forced to its seat by contact with the wall 37, thereby closing the opening 41, and at the same time the ball 35 will be forced upwardly in its cage 36, uncovering the opening 34 in the bottom of the lifter 33 and permitting the liquid in the tank 15 to enter and fill the lifter 33.

The downward movement of the lifter will displace the liquid beneath it and cause it to circulate in the tank 15 and through the perforations 60, substantially as shown and described in another application of mine filed December 8, 1922, Serial No. 605,627.

Every downward movement of the lifter 33 will cause a thorough mixture of the liquid in the tank so that the same quality of liquid will be dispensed to each customer.

When the block 49 is raised, the spring 55 assists in carrying the load of liquid contained within the lifter 33.

As the lifter 33 is raised, the ball 35 will close the outlet 34 and the lifter will be filled with liquid.

When the lifter passes the point 43, the ball 42 will be free to move down the inclined surface 44 and uncover the opening 41, permitting the liquid in the lifter 33 to flow into the passage 39 from which it may be withdrawn through the faucet 22.

All of the parts may be taken apart readily to permit them to be thoroughly cleansed.

This makes a very convenient apparatus for dispensing liquid and particularly milk in lunch rooms and restaurants.

It is believed that its operation and many advantages will be understood readily without further description.

Having thus described my invention, I claim:

1. The combination of a liquid container having communicating chambers, of which the inner chamber has a delivery port near its upper end communicating with a delivery passage; a faucet at the discharge end of said delivery passage; a cup-shaped liquid lifter provided with a perforated flange substantially fitting one chamber and having a normally closed inlet valve in the bottom thereof and a discharge valve in a side wall thereof; means on the inner chamber for preventing the opening of the discharge valve except when the lifter is at the upper end of said chamber; and means permitting the inlet valve to open during the lowering of the lifter.

2. The combination of a liquid container having communicating chambers; a cup-shaped liquid lifter provided with a perforated flange substantially fitting one chamber and having a normally closed inlet valve in the bottom thereof and a discharge valve in a side wall thereof; means on the inner chamber for preventing the opening of the discharge valve except when the lifter is at the upper end of said chamber; means permitting the inlet valve to open during the lowering of the lifter; and a valved delivery passage communicating with the inner chamber near its upper end into which the contents of the lifter are adapted to be discharged when the discharge valve of the lifter is opened.

3. The combination of a liquid container having communicating chambers and a delivery passage communicating with an opening in the wall of the inner chamber near the top thereof; a cup-shaped liquid lifter in the inner chamber provided with a perforated flange substantially fitting the wall of said chamber and having an outlet near the bottom of the vertical wall thereof; a valve in said outlet; and a vertical member extending downwardly from said opening in the wall of the inner chamber and adapted to co-act with said valve and retain it in closed position when said valve is below said opening.

4. The combination of a liquid container having communicating chambers and a delivery passage communicating with an opening in the wall of the inner chamber near the top thereof; a cup-shaped liquid lifter in the inner chamber having an outlet near the bottom of the vertical wall thereof; a valve in said outlet; means preventing the rotation of said lifter; and a vertical member extending downwardly from said opening in the wall of the inner chamber and adapted to coact with said valve and retain it in closed position when said valve is below said opening.

5. The combination of a liquid container having communicating chambers; a cup-shaped liquid lifter therein provided with a perforated flange substantially fitting one chamber and having an outlet at one side thereof; a cage projecting from said side at said outlet; a ball in said cage; and means on said container coacting with said ball to force it partially into said outlet and close the same during the vertical movement of said lifter.

6. The combination of a liquid container having communicating chambers, of which the outer chamber is provided on its inner face with a delivery passage while the inner chamber is provided near its top with a discharge opening communicating with the upper end of said passage and has below said opening a vertical wall projecting into said chamber; a cup-shaped liquid lifter therein having an outlet at the bottom of the vertical wall thereof; and a ball valve on said lifter adapted to contact with said vertical wall and close said opening during the reciprocation of said lifter below said discharge opening.

7. The combination of a liquid container; a tank therein having a discharge passage therein; a perforated cylinder in said tank having a depression at one side provided with a vertical wall extending nearly to the top thereof above which is a discharge opening communicating with said passage; a cup-shaped liquid lifter therein provided with a perforated flange substantially fitting said cylinder and having an outlet at the bottom of the vertical wall thereof; a valve on said lifter nominally contacting with said wall and adapted to close said outlet opening during the lowering of the lifter and during its upward movement until it reaches a point above the upper end of said wall at which point it is free to move outwardly and open said outlet.

8. The combination of a liquid container; a tank therein; a perforated cylinder in said tank having a vertical wall at one side extending nearly to the top thereof; a cup-shaped liquid lifter therein provided with a perforated flange substantially fitting said cylinder and having an outlet at the bottom of the vertical wall thereof; a ball valve on said lifter adapted to contact with said vertical wall and close said outlet opening during the lowering of the lifter and during its upward movement until it reaches a point above the termination of said vertical wall.

9. The combination of a liquid container; a tank therein; a perforated cylinder in said tank; a cup-shaped liquid lifter therein provided with a perforated flange substantially fitting said cylinder and having an outlet at one side thereof; a cage projecting from said side at said outlet; a ball in said cage; and means on the inner wall of said tank coacting with said ball to force it partially into said outlet and close the same during a part of the vertical movement of said lifter.

Signed by me at 746 Old South Bldg., Boston, Mass., this 6th day of July, 1923.

ALFRED L. MORON.

Witnesses:
WALTER E. LOMBARD,
NATHAN C. LOMBARD.